United States Patent [19]

Huddle

[11] Patent Number: 4,593,805
[45] Date of Patent: Jun. 10, 1986

[54] SYSTEM FOR SORTING CONTAINERS

[75] Inventor: Herbert C. Huddle, Napoleon, Ohio

[73] Assignee: Campbell Soup Company, Camden, N.J.

[21] Appl. No.: 671,559

[22] Filed: Nov. 15, 1984

[51] Int. Cl.$^4$ ............................................. B65G 47/24
[52] U.S. Cl. ..................... 198/381; 198/400; 198/690.1; 209/597; 209/636
[58] Field of Search ............... 198/399, 406, 690, 404, 198/398, 400, 381, 380, 382; 209/636, 539, 597, 907

[56] References Cited

U.S. PATENT DOCUMENTS

| | | | |
|---|---|---|---|
| 2,242,532 | 5/1941 | Marx | 198/406 |
| 2,684,147 | 7/1954 | Holstebro | 198/382 |
| 2,775,334 | 12/1956 | Jeremiah | 198/406 X |
| 2,910,165 | 10/1959 | Byington | 198/398 X |
| 2,937,738 | 5/1960 | Albertoli et al. | 198/406 X |
| 3,526,311 | 9/1970 | Robinson | 198/400 |
| 3,565,234 | 2/1971 | Birdsong | 198/381 |
| 4,081,069 | 3/1978 | Ono | 198/381 |

Primary Examiner—Joseph E. Valenza
Assistant Examiner—Jonathan D. Holmes
Attorney, Agent, or Firm—Albert L. Free

[57] ABSTRACT

A can-orienting system in which open-topped steel-based cans in random orientations are first automatically aligned with each other by feeding them to an aligning chute to form an end-on train of cans which are fed end-on, at a controlled rate, to the edge of a first rotating magnetic pick-up wheel which picks up and carries with it the successive leading cans in the train. A second magnetic wheel, rotating oppositely to the first wheel, is preferably located above the first wheel and to the opposite side of the first wheel from the point at which the cans are fed to the first wheel. Those cans initially having their bottoms against the first wheel stay on the first wheel until they are rotated far enough to be wiped off onto a first separator plate, all with their bottoms against the plate; those cans having their open ends against the first wheel are pulled off by the second wheel and carried by it to a second separator plate, all with their bottoms against the plate. The two oriented groups of cans may then be merged into a single array of cans, all with their bottoms facing the same way.

13 Claims, 9 Drawing Figures

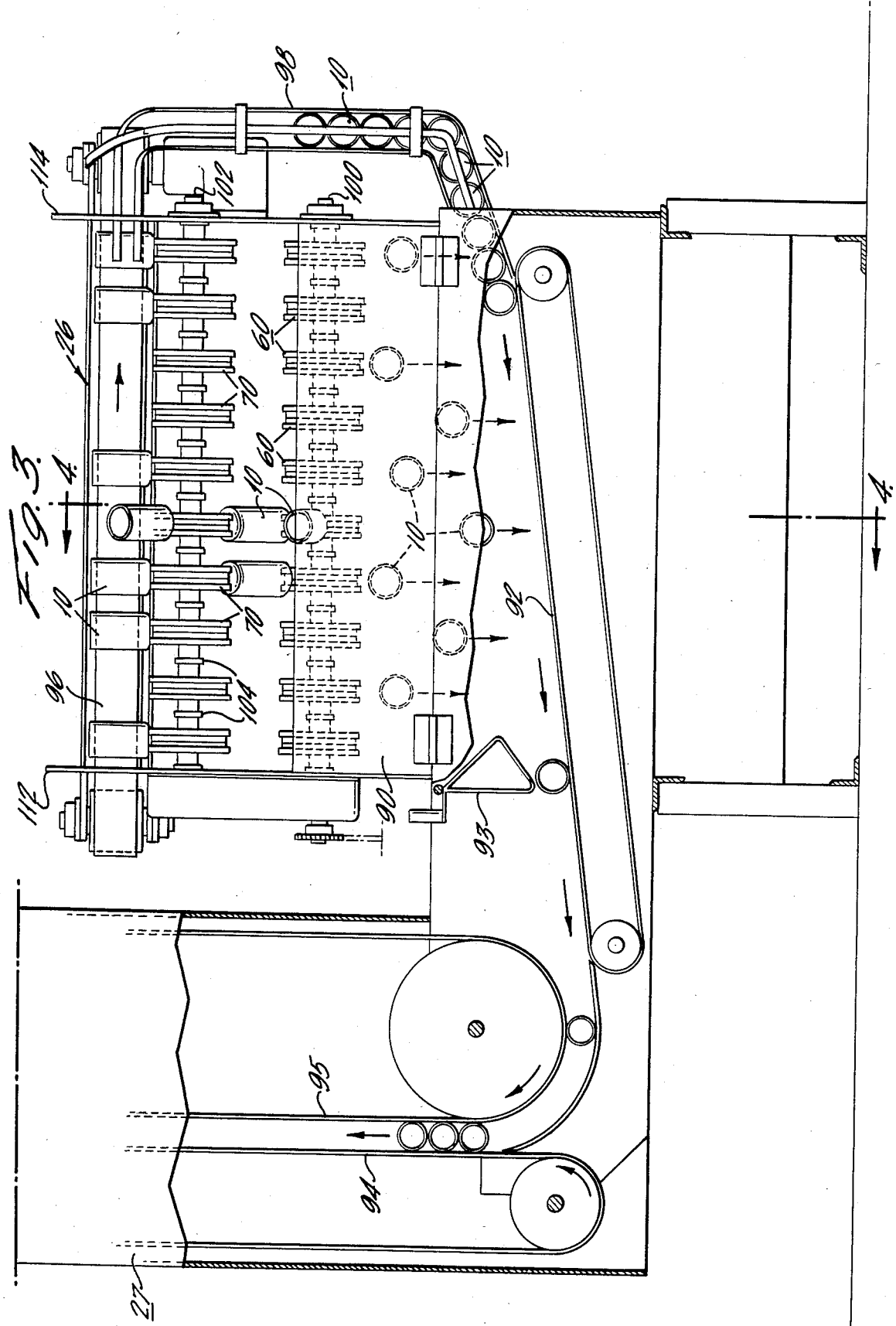

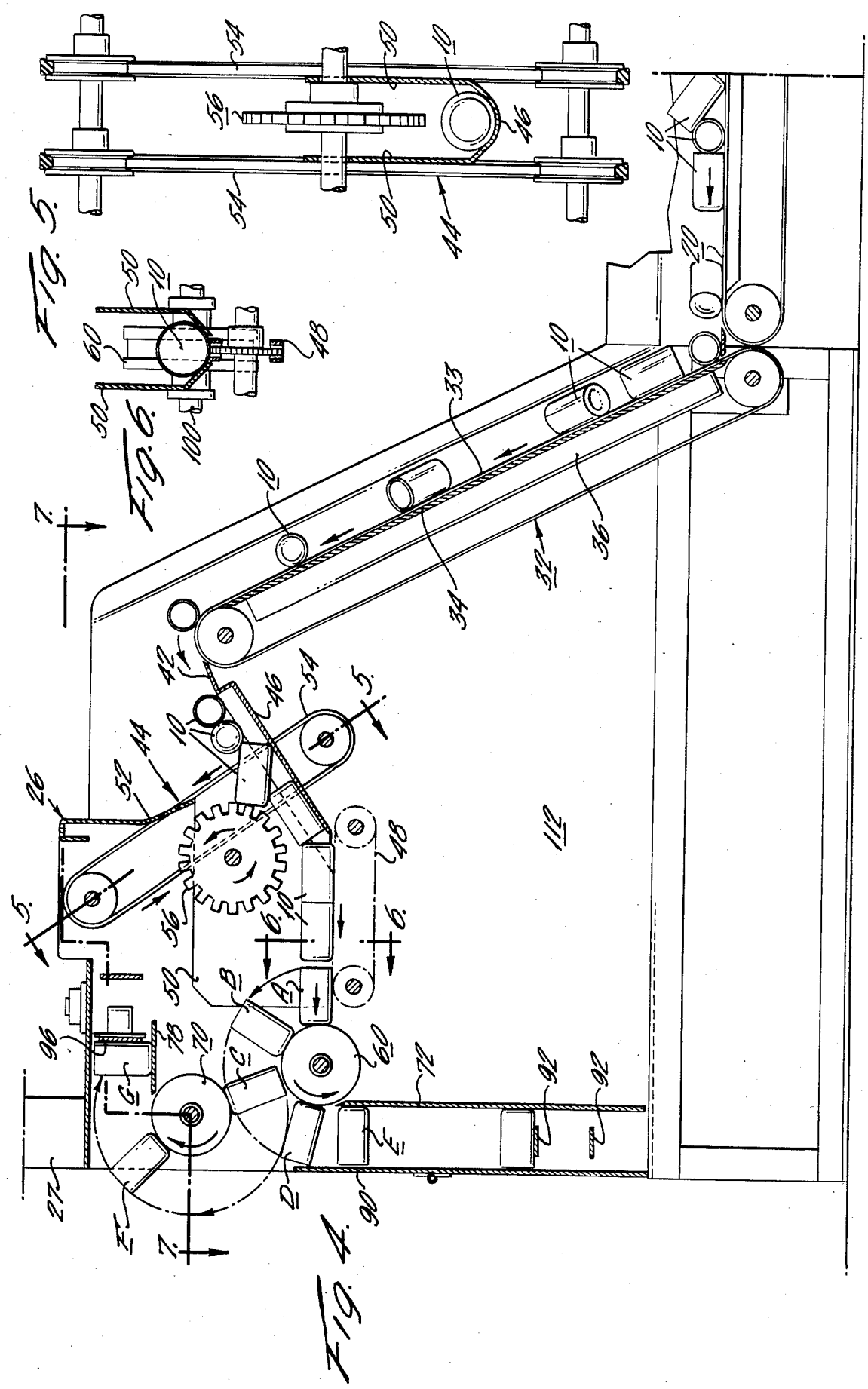

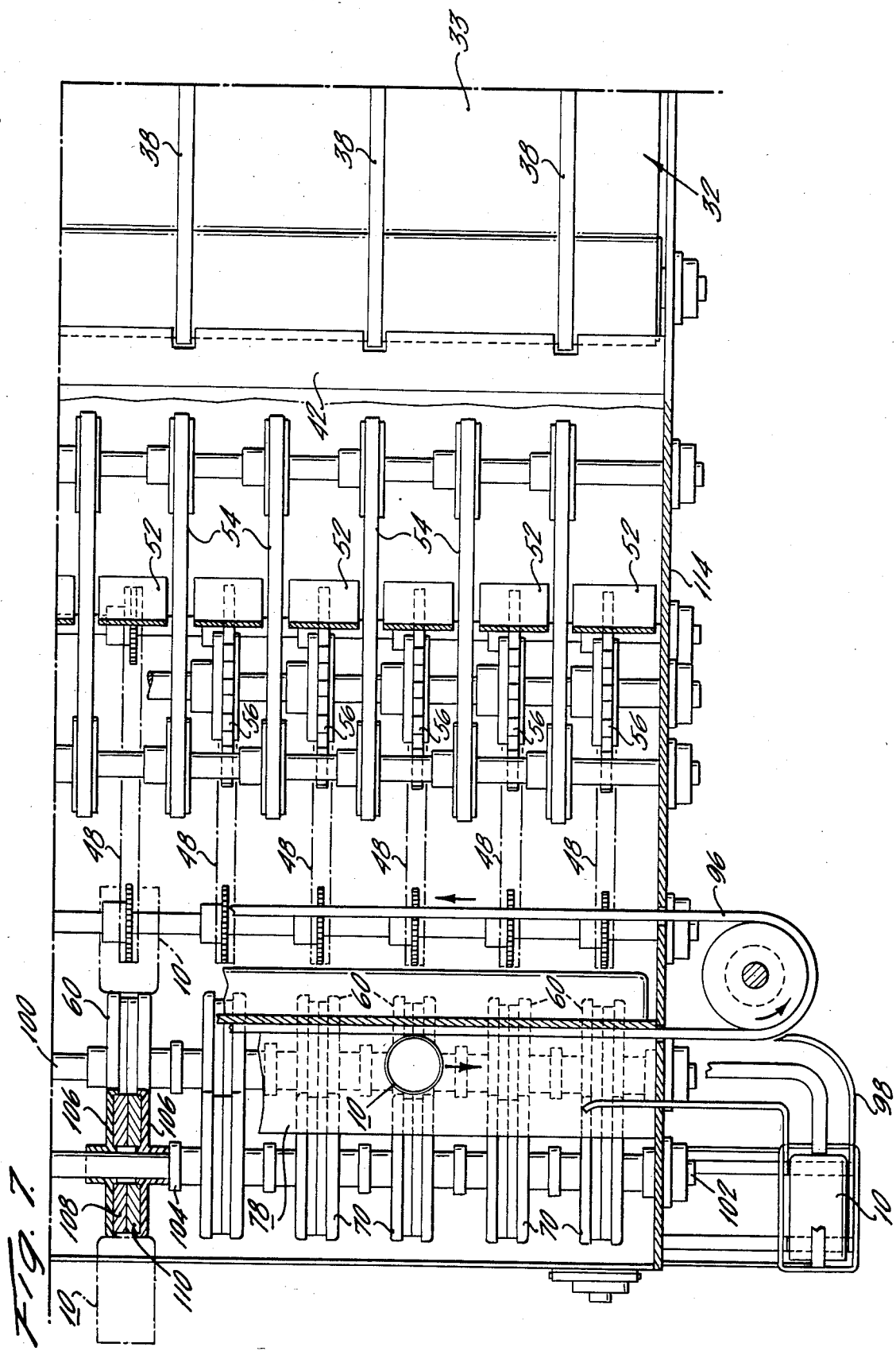

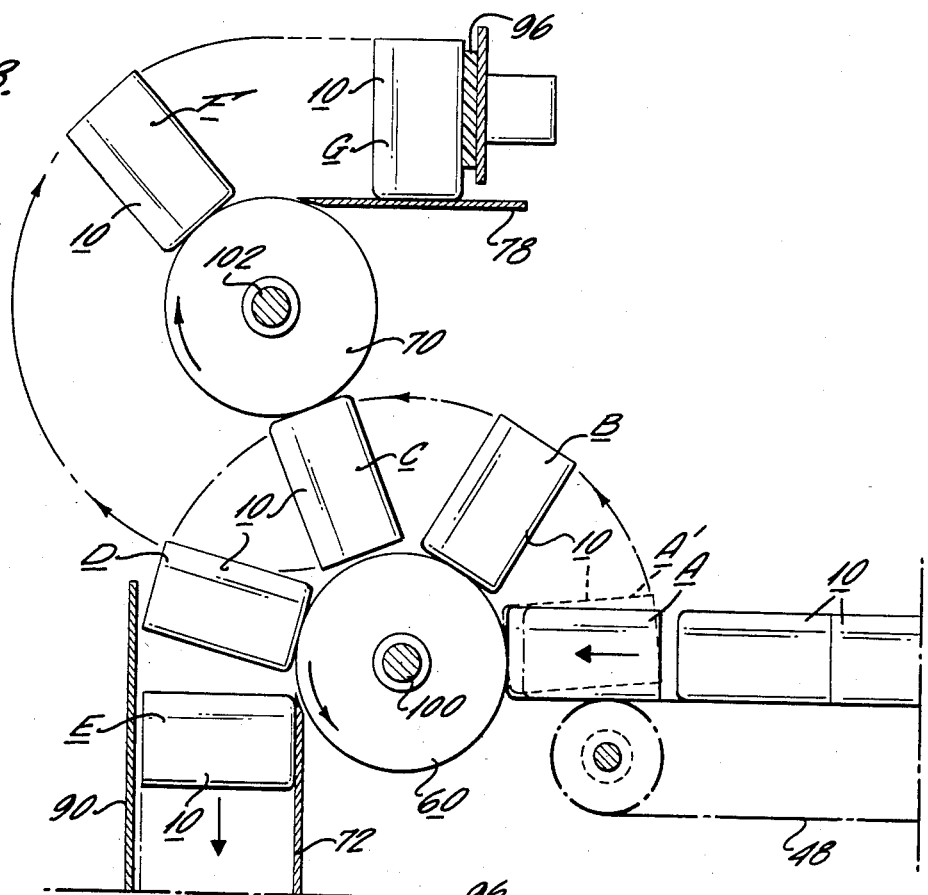
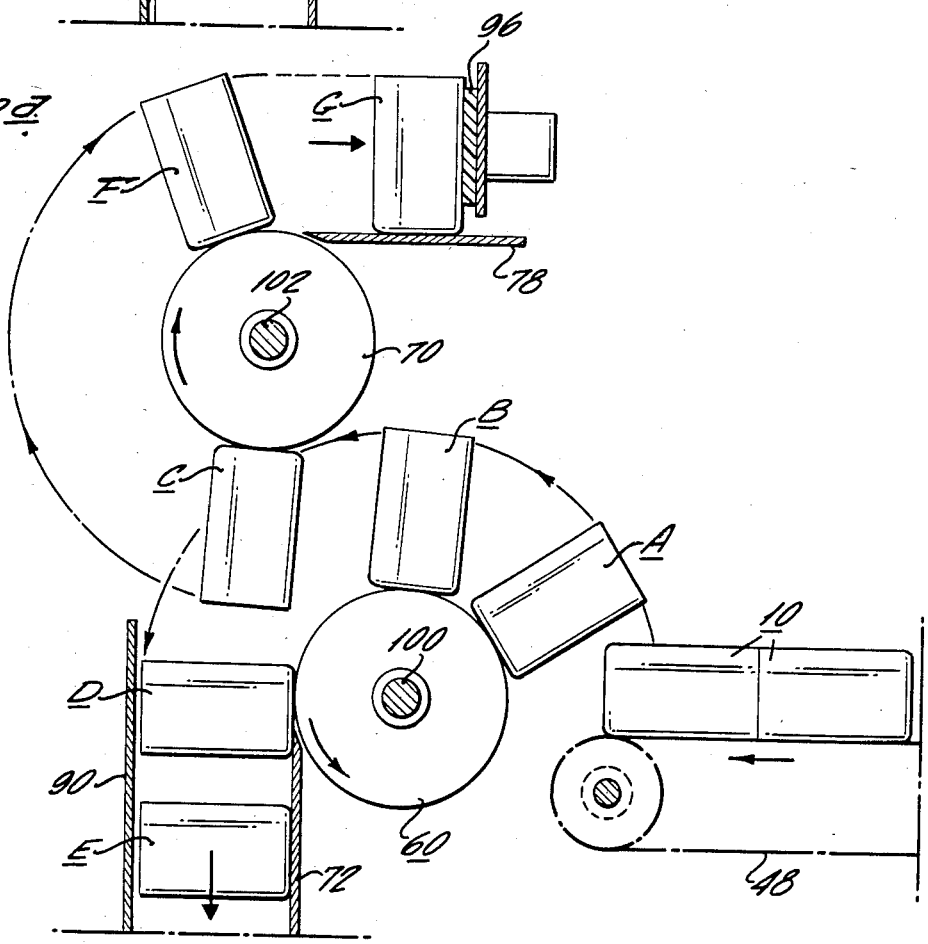

SYSTEM FOR SORTING CONTAINERS

BACKGROUND OF THE INVENTION

This invention relates to systems for sorting containers, and particularly for sorting containers comprising magnetically-attractable material, having a length greater than their diameters, and having one end closed and the other end open.

There are many applications in which such sorting is highly desirable. For example, in the food packaging industry it is common to require the establishment of a moving mass of open-topped metal containers each resting on its closed end on a conveyor, so that material can later be automatically fed into the open tops of the containers as they travel along the conveyor. In some instances such containers are temporarily stored in a bin in which they are randomly oriented, and it is therefore necessary to take the randomly oriented containers and turn them so that the closed bottom ends are all positioned downwardly against the conveyor. While this can be done manually, at considerable expense, it is preferred to provide a system which will do this automatically.

Accordingly, it is an object of the present invention to provide a system for receiving a mass of containers in different orientations and for placing at least a selected group of them all in the same orientation.

Another object is to provide such a system which first places the containers in an end-to-end series train, and then automatically sorts those whose open ends face forwardly from those whose open ends face rearwardly in the train, whereby the containers are sorted into at least one set in which the same ends of the containers are directed downwardly upon a conveyor. Preferably two such sets are formed and then merged into a single common set.

A further object is to provide such a system which operates reliably and at relatively high speeds.

BRIEF SUMMARY OF THE INVENTION

These and other objects of the invention are achieved by a system in which containers each having one end which is more strongly magnetically attractable than its other end, and disposed in various orientations, are first formed into an end-on series train; those containers having their more strongly magnetically attractable ends positioned forwardly in the train are then automatically sorted from those which are oppositely oriented. At least one, and preferably both, of the sorted sets are thereby arranged so that all containers in the set are oriented the same way.

To accomplish the sorting, each successive front container in the train is preferably moved end-on into contact with a surface region of a first rotating magnetic wheel, which holds the front container magnetically to it and, as it rotates, moves the container to a location wherein its opposite end passes adjacent a second magnetic wheel rotating in the opposite direction to the first wheel. At this point in the operation, if the more strongly magnetically attractable end of the can is adjacent the first wheel it will remain on the first wheel as the latter wheel rotates further, and may then be wiped off on to a first separator plate with its more strongly magnetically attractable end in a predetermined position on the separator plate; if, on the other hand, the more strongly magnetically attractable end of the container is adjacent the second wheel, the second wheel will attract the container, retain it on its periphery, and move it around to a point at which it may be wiped off upon a second separator plate, in a predetermined orientation. There are thus formed two sets of containers in each of which the containers are all oriented in the same direction; preferably, these two sets are then merged with each other so that all containers in both trains are oriented the same way upon a common conveyor. In the preferred embodiment, the container is a cylindrical metal container having one open end, and a closed end of ferromagnetic material constituting the more strongly magnetically attractive end.

Preferably the two magnetic wheels are rotated at the same speed which is such, in relation to the speed at which the end-on series train of containers is supplied to it, that the first container in the train is picked up and rotated out of the way of the next container in the train without interference therewith, and that sufficient spacing is provided between the containers on the first wheel whereby when one container is retained on the first wheel and one of the adjacent containers is retained on the second wheel, there will be no harmful interference between the containers on the two wheels as they rotate past each other in the sorting process.

Preferably, the second wheel is positioned above and somewhat toward the output side of the first wheel, thereby to enhance the desired sorting action. Also preferably, each container has a length in excess of its diameter.

BRIEF DESCRIPTION OF FIGURES

Other objects and features of the invention will be more readily understood from a consideration of the following description, taken with the accompanying drawings, in which:

FIG. 3 is a rear elevational view of a system according to the invention;

FIG. 4 is a sectional view of the system taken along lines 4—4 of FIG. 3;

FIG. 5 is a fragmentary sectional view of the container aligning apparatus, taken along lines 5—5 of FIG. 4;

FIG. 6 is a sectional view taken along lines 6—6 of FIG. 5;

FIG. 7 is a top plan view of the system of FIG. 4; and

FIGS. 8 and 8A are fragmentary schematic side views of the container-sorting portion of the system, showing typical positions of the cans at two successive times.

DESCRIPTION OF PREFERRED EMBODIMENTS

Figure 1:
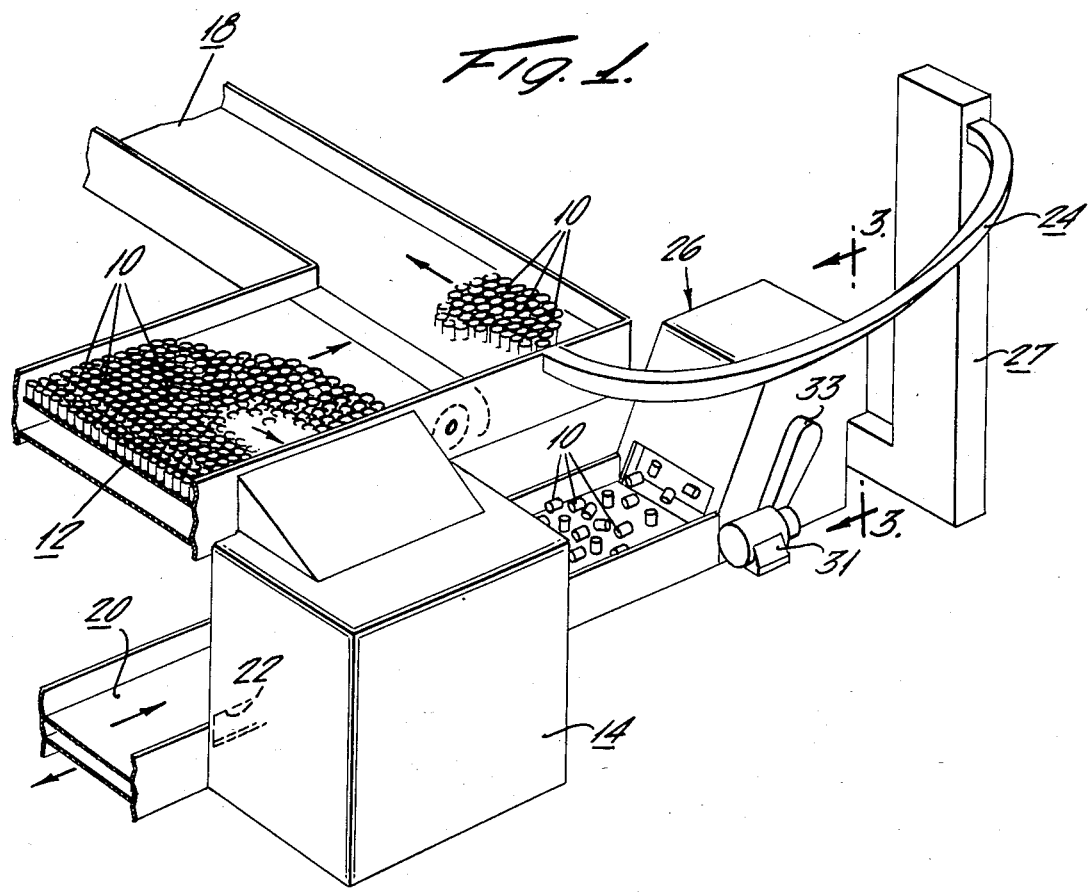
FIG. 1 is a schematic perspective view illustrating one typical use of the system of the invention.
Figure 2:
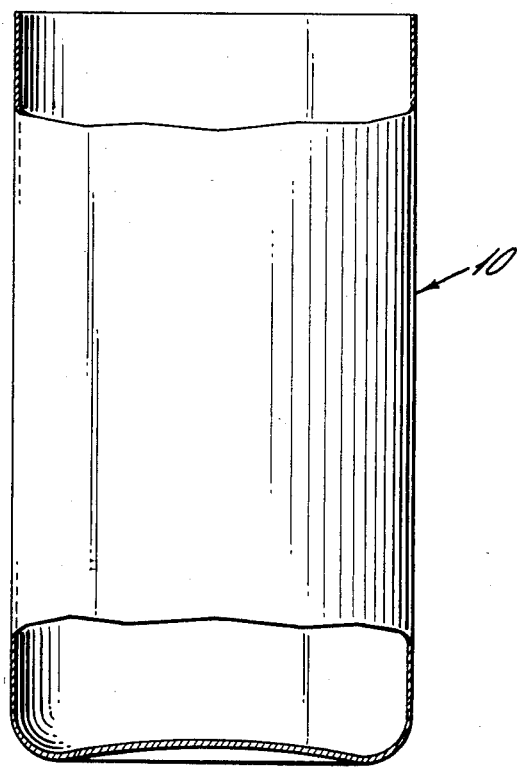
FIG. 2 is an elevational view with parts broken away of a typical example of the containers which may be sorted by the system of the invention.

Referring now to the embodiment and application of the invention shown by way of example only in the accompanying figures, in FIG. 1 it is assumed that a mass of containers such as 10 are travelling on a belt conveyor 12 from left to right; as an example, as shown in FIG. 2 these may be cylindrical open-topped cans about 2⅛" in diameter and about 3⅞" long of the so-called drawn and ironed type such as are sometimes used to contain fruit or vegetable juices. In a typical case they may arrive on conveyor 12 directly from the apparatus which forms them. Typically, they are made entirely of tin-plated steel and may for example have right cylindrical side walls about 6 mils in thickness and a bottom about 12 mils in thickness which is domed at its edges, as shown in FIG. 2. In any event, the containers are such that each of them will be more strongly magnetically attractable by a magnetic field adjacent the bottom of the can then by a magnetic field adjacent the open top of the can.

Adjacent and below the conveyor 12 is a so-called jumble bin 14, which may be a very large container sometimes containing as many as 300,000 cans. Should there be a jam-up or other closing down of the conveyor system beyond the jumble bin while the can fabricator continues to put out cans onto conveyor 12, the arrangement is such that the excess cans from the fabricator will fall off the conveyor into the jumble bin; appropriate protection is normally provided within the bin to minimize damaging impact to the falling cans and to support the majority of the weight of the mass of the cans. The details of the interior of the jumble bin are not shown, since they may be entirely conventional and are not in themselves a part of the present invention.

Downstream of conveyor 12 there is, in this example, provided an output conveyor 18 running at right angles to conveyor 12, which under normal conditions transports away the cans delivered to it by conveyor 12. However, after a substantial number of cans have fallen into the jumble bin 14 there will occasionally occur a time when the machine which makes the cans is shut down, and when it is desired to take at least some of the randomly-oriented cans in the jumble bin and deliver them onto the output conveyor 18, all with their closed ends positioned downwardly on the conveyor belt. At such times a jumble-bin conveyor belt 20 is started, so that it passes adjacent a feed opening 22 of the jumble bin through which randomly-oriented cans fall on to its top surface; the jumble-bin belt carries such randomly-oriented cans to the can orienting and sorting system of the present invention. This system then acts to receive the randomly-oriented cans from the jumble bin conveyor and, ultimately, to deliver them by way of a twist chute 24 onto the output conveyor 18 all in the desired bottom-downward orientation.

Accordingly, in FIG. 1 there is shown schematically the exterior of a can unscrambler 26 constructed and operating according to the invention to take the cans from the jumble bin conveyor belt 20 and deliver them to the bottom of a belt elevator 27, all in the same orientation, the elevator then acting to raise the train of similarly oriented cans to the top of the elevator whence they can slide by gravity along the twist chute 24 onto the output conveyor 18. The can unscrambler 26 is powered by means of a conventional motor 31 and drive system such as 33. The remaining figures show the details of the can unscrambler 26, as will now be described.

Referring first especially to FIG. 4, the cans on the jumble bin output conveyor 20 are delivered thereby to a magnetically-energized, inclined conveyor 32 which raises them in random orientation from the lower end of the conveyor to its upper end as shown. In conveyor 32, a belt 33 moves sliding over an underlying plate 34 of ferromagnetic material beneath which an appropriate magnetizing assembly 36 is provided so that the surface of plate 34 beneath the belt, in effect, has the same magnetic polarity overall and therefore will tend to attract the cans no matter where they are on the plate as they rise along the inclined belt. Suitable forms of magnetized conveyors being well known in the art, they need not be described here in detail. Preferably in this example the belt 33 is provided with a series of longitudinally-extending and laterally spaced-apart raised ribs such as 38 (see FIG. 7), which tend to stabilize the cans in position by limiting the extent of lateral rolling motion which they can exhibit.

When the cans reach the top of the inclined belt, they will be picked off by, and slide over the top of, a slide plate 42. A typical total width for the inclined belt and this steel plate is about 3 feet.

The cans on the slide plate will then slide toward and into a can aligner system indicated generally as 44. This apparatus consists essentially of a plurality of parallel trough-like chutes such as 46 (see FIG. 6), of a width and curvature such as to receive and embrace the cans as they slide along the interior bottoms of the troughs in an end-on orientation, that is, with the longitudinal axes of the cans parallel to the longitudinal axes of the troughs. Typically there may be 10 such troughs, which deliver the cans to the corresponding 10 single-lane feed chains such as 48 (FIG. 7), extending horizontally from the lower ends of the troughs as shown.

Vertical partition walls such as 50 are provided on each side of the troughs to provide alley-like compartments through which each train of containers is restricted to pass, and a weir plate 52 is provided above the entrances to the troughs to hold back cans which pile up on each other at the entrance to the troughs. In addition, between the troughs there are preferably provided a plurality of high-speed agitating belts such as 54, each of which may comprise a conventional endless, riveted link belt, each moving along the upward direction on the belt run which confronts the incoming cans. The function of these belts is to agitate the cans at the entrance ends of the alleys and thus avoid jam-ups while providing sufficient agitation of the cans that they will at times orient themselves in the proper direction to fit into and slide down the troughs. Also preferably provided are a plurality of notched wheels such as 56, typically made of a belting material, positioned in each alley and rotating against the direction of flow of the cans through the troughs; any can in a raised position in the trough is contacted by a rotating notched wheel and rejected against the direction of can flow so that only a single lane of properly aligned cans can flow through the troughs below the notched wheels.

The cans on each of the single-lane feed chains 48 are therefore all properly aligned along the direction of movement of the feed chain, so as to form an end-on serial train, with each can substantially abutting the one ahead of it; however, the cans may be oriented in either of two opposite directions, one in which the open end of the can is in the leading position, facing forwardly, and the other in which the open end of the can faces rearwardly.

Each single-lane feed chain delivers its train of cans end-on against the periphery of the corresponding one of a set of first magnetic wheels such as 60, which rotate about axes at right angles to the direction of delivery of the cans to the wheels. Thus the first can in each train contacts the corresponding first magnetic wheel end-on, as shown in FIG. 4. Each magnetic wheel is composed of a relatively strong magnetic material having a single common magnetic pole around its periphery and an opposite pole radially inwardly thereof, so that the cans are uniformly attracted toward the center of the wheel and thus are frictionally secured to the wheel as it rotates counterclockwise in the view depicted in FIG. 4. These first magnetic wheels therefore constitute pickup wheels, which successively pick up the front cans in the single lane and move them counterclockwise, as shown.

As further shown in FIG. 8 and discussed in more detail hereinafter, the cans on the single-lane feed chains typically are substantially in contact with each other until the front cans come within a short distance, such as a one-half inch, of the pickup wheels, at which time the magnetic attraction of the wheels suddenly moves the leading cans forwardly and away from the cans behind them, whereby when the leading cans are rotated upwardly by the wheel they can move free of contact with the cans immediately behind them, which otherwise might interfere with such motion.

The spacings between the cans on each magnetic pickup wheel are determined by the relation of the speed of its single-lane feed chain with respect to the rate of rotation and size of the magnetic pickup wheel. The faster the pickup wheel rotates with respect to the speed of the single-lane feed chain, the greater the spacing between the cans on the periphery of the pickup wheel. In general, in order to pass cans through the system at a high rate it is desired that they be relatively close together on the pickup wheel; on the other hand, as will presently be described, if they are too close together there may be interference with the desired later sorting action, and a compromise between speed of operation and reliability is generally to be made.

More particularly, in FIG. 4 can A represents a can which has just reached the pickup magnetic wheel 60, can B represents one which has been picked up and moved part-way around the axis of wheel 60, and can C represents a can which was earlier picked up and has already been moved by the wheel to the position shown.

Above and to the left of the pick-up wheels 60 as shown in FIG. 4 are a corresponding set of second magnetic wheels such as 70, which may be designated as sorting wheels since they provide a sorting function with respect to the cans, as is presently to be described. A small amount of clearance is provided between the sorting wheels and the cans such as can C, which has its axis along radii of both wheels. This small clearance permits each can to pass between the two wheels without frictional engagement.

In FIG. 4, for example, the ends of the cans depicted as somewhat rounded or domed are the closed ends of the cans, while the completely squared-off ends are the open ends of the can. The operation of the two sets of magnetic wheels in each case is to assure that those cans whose bottoms are against the pickup wheel 60 are retained by the pickup wheel and wiped off onto a separator plate 72, with their bottoms all facing downward against such separator plate as shown for can E, for example. Their further function is to assure that each can such as C, for which the closed end is remote from its magnetic pickup wheel, is more strongly magnetically attracted to the corresponding sorting wheel 70, is thereby magnetically moved into contact with sorting wheel 70, and is subsequently moved onward in a clockwise direction on wheel 70 as depicted, for example, with respect to can F. Upon further rotation of the can upon the sorter wheel, it is wiped off onto a separator plate 78 and moved to a position such as is shown for can G, with its closed end facing downward upon the separator plate 78.

Accordingly, those cans presented with their most magnetically attractable ends, namely their bottom ends, facing forwardly on the single-lane feed chains, are sorted by the pick off wheels 60 onto the separator plates 72, and those for which the open-ends of the cans are presented to pick-up wheels 60 are sorted by the action of the wheels 70 so that their bottom ends ultimately lie upon separator plates 78.

Referring particularly to FIGS. 8 and 8A, wherein the cans are labelled with the same letters as in FIG. 4, the broken-line representation of the top and bottom of can A shows its initial position at a time when it is abutting the can behind it, and the full-line representation of can A shows its position immediately thereafter when it has been abruptly moved forward against wheel 60 by magnetic attraction. The broken-line representation of the entire can A, designated A', shows the immediately subsequent position when it turns slightly counterclockwise so that its axis lies along the radius of wheel 70, its equilibirum position. The latter turning occurs because the longitudinal axes of the cans being fed to the wheel extend along a line slightly above the axes of the wheels 60, and aids in moving can A out of the way of the following can.

FIG. 8A shows the can assembly of FIG. 8 a short time later, when the wheels 60 and 70 and the cans have moved to the positions shown. From the figure it can be appreciated that upon still further rotations the cans will not interfere with each other in the pickup and sorting processes.

As shown particularly clearly in FIG. 3, those cans picked up and retained by the pick-up wheels 60 are discharged downwardly into the space between the separator plate 72 and another parallel plate 90, whereupon they fall on their sides onto an elevator feed belt 92 which carries them to the bottoms of elevator belts 94,95. Those cans picked up by the sorting wheels 70 are delivered into position on separator plate 78 with their sides against a magnetically-activated belt 96 which, as it moves, slides them along on their closed ends to a can track 98, through which they fall while being turned into positions parallel to the cans from the pickup wheel, so that they also arrive on their sides on the belt 92. The latter arrangement is commonly referred to as a doubler, in that the cans from the pick-up wheel and the cans from the sorter wheel are merged into a single lane by the action just described. A can deflector plate 93 hinged to hang just above the cans on belt 92 may be used to brush back and force into the train any cans which may be "piggy-backed" on other cans on belt 92.

As previously described generally with respect to FIG. 1, the merged trains of cans are then lifted by the elevator belts 94 and 95 with their axes horizontal, and then are delivered by a conventional twist chute 24 onto the output conveyor 18, all with their bottoms facing down, as desired.

FIGS. 3 and 7 show particularly clearly the details of a preferred construction for each of the magnetic wheel assemblies. The wheels are all rotated at the same speed by common motor-driven drive shafts 100 and 102, onto which are splined a plurality of spacer collars such as 104, between which are mounted opposed pairs of magnet-retainer flanges such as 106. Between each pair of flanges is mounted a pair of substantially identical ceramic magnet rings such as 108 and 110. The outside collars on the shaft are held in position by end plates 112 and 114.

With the cans described above in this example, each magnet may be about 8¼" in diameter and ½" in width, and the flanges such as 106 are preferably of a hard, smooth plastic material such as DELRIN, extending partially over the ends of the magnets to a distance of approximately ⅛" beyond the peripheral edges of the magnets, so that the cans actually contact the plastic rather than the magnets, thereby protecting the magnet material from shock and abrasion.

It has been found that if the sorter wheels 70 are placed directly above the corresponding magnetic pickup wheels 60, the sorting action is less reliable then if, as shown, the sorter wheels are placed above the pick-up wheel but somewhat to the output sides thereof.

Accordingly, there has been described a system by means of which randomly-oriented cans, one end of each of which is more strongly magnetically attractable than the other, are automatically formed into an end-on aligned train and then automatically sorted into two sets, the cans in each sorted set all being oriented in the same direction, the two sorted sets then being mergable into a single common set in which all cans are oriented identically. This operation is reliable and capable of high-speed operation; for example, using 10 sets of wheels as shown, cans may be sorted at a rate of at least about 600 cans per minute.

While considered less desirable, it is possible to use a sorter wheel which partially overlaps the side of the pick-up wheel so that the distance between the side surfaces of the wheels slightly exceeds the lengths of the cans, and to feed the cans end-on onto a non-overlapped portion of the pick-up wheel; in such event those cans having their open ends against the side of the pickup wheel will be attracted onto the sorter wheel when they pass between the two wheels, while the other cans will remain on the pick-up wheel, to effect the desired sorting.

Accordingly, while the invention has been described with particular reference to specific embodiments thereof in the interest of complete definiteness, it will be understood that it may be embodied in a variety of forms diverse from those specifically shown and described without departing from the spirit and scope of the invention as defined by the appended claims.

What is claimed is:

1. A system for receiving variously oriented, substantially cylindrical containers, and for forming an array of said containers in which all of said containers are oriented in the same direction, each of said containers having one end which is more strongly magnetically attractable than its other end, said system comprising:

container aligning means for receiving said containers and for forming therefrom a series train of said containers in end-on alignment with each other;

a first rotating magnetic wheel;

container feed means for successively feeding the first of said containers in said train substantially into end-on contact with a surface region of said first magnetic wheel spaced radially outwardly from the axes of rotation of said wheel, so that said successive first containers are magnetically attracted to and carried by said wheel as it rotates, the speed of rotation of said first magnetic wheel being sufficiently high that each of said first containers is rotated by said wheel out of the way of the next following container in said train as it advances toward said wheel;

a second rotating magnetic wheel, rotating oppositely to said first magnetic wheel and positioned so that a surface region thereof is spaced from said surface region of said first wheel by slightly more than the lengths of said containers, so that when each of said containers is moved by said first wheel to a position between said first and second wheels it will be attracted to and held by that one of said wheels which is adjacent the more strongly magnetically attractable end of said each container.

2. The system of claim 1, wherein said containers are fed to said first magnetic wheels end-on adjacent the periphery of said wheel, with the longitudinal axes of said containers in a plane perpendicular to the axis of rotation of said first magnetic wheel.

3. The system of claim 1, wherein said first and second wheels have axes of rotation parallel to each other, with the periphery of said first wheel spaced from the periphery of said second wheel by a distance slightly greater than the lengths of said containers.

4. The system of claim 3, wherein said axis of said second wheel is at a higher position than said axes of said first wheel.

5. The system of claim 4, wherein said axis of said second wheel is on the oposite side of said axis of said first wheel from the position on said first wheel at which said containers are fed to it.

6. The system of claim 1, wherein said first and second wheels are rotated at substantially the same speed.

7. The system of claim 1, comprising first means for separating from said second wheel those of said containers carried by said second wheel and second means for separating from said first wheel those of said containers remaining on said first wheel after said containers have been rotated past said second wheel.

8. The system of claim 7, wherein said first and second separating means comprise means for forming from said containers a first set of containers from said second wheel all oriented in the same direction and a second set of containers from said first wheel all oriented in the same direction.

9. The system of claim 8, comprising means for merging said first and second sets of containers into a single common set in which all containers are oriented in the same direction.

10. The system of claim 1, wherein said container feed means is aligned to feed said containers to said first wheel with the longitudinal axes of said containers in a plane perpendicular to the axis of rotation of said first wheel and directed along a line above said axis of rotation of said first wheel.

11. A system for receiving from a jumble bin randomly oriented cylindrical cans of magnetically attractable material each having an open end and a closed end and a length greater than its diameter, and for forming therefrom a common set of containers all oriented in the same direction, comprising:

first conveyor means for receiving and transporting said cans from said jumble box;

can aligning means for receiving said cans from said first conveyor means and for forming said cans into an end-on aligned train, said aligning means comprising chute means for passing cans only in said aligned train;

a rotating magnetic pick-up wheel positioned to receive successive leading cans in said train, said cans being fed to said pick-up wheel end-on so that the leading end of each can contacts the exterior peripheral edge of said pick-up wheel and is magnetically attracted to and carried by said pick-up wheel as it rotates;

a magnetic sorter wheel rotatable oppositely to the direction of rotation of said pick-up wheel, with its periphery spaced from that of said pick-up wheel by a distance slightly greater than the lengths of said cans, whereby those cans having their bottom ends adjacent said sorter wheel are attracted to and carried by said sorter wheel as it rotates and those having their closed ends adjacent said pick-up wheel remain thereon and are carried by it as it continues to rotate;

means for separating said cans from said sorter wheel to form a first set of cans all oriented in the same direction;

means for separating said cans from said pickup wheel after they pass said sorter wheel to form a second set of cans all oriented in the same direction; and means for merging said first and second sets of cans to form said common set in which all cans are oriented in the same direction.

12. The system of claim 11, wherein the axis of rotation of said sorter wheel is parallel to, higher than, and to one side of, said axis of said pick-up wheel.

13. The system of claim 11, wherein the axes of said cans fed to said pick-up wheel are in a plane perpendicular to the axis of rotation of said pick-up wheel and lie along a line which is tilted backwardly with respect to the radius of said pick-up wheel, counter to the direction of rotation of said pick-up wheel.

* * * * *